(12) United States Patent
Hind

(10) Patent No.: US 11,687,590 B2
(45) Date of Patent: Jun. 27, 2023

(54) EFFICIENT INDEX UPDATING IN A CONTENT MANAGEMENT SYSTEM

(71) Applicant: Hyland UK Operations Limited, Maidenhead (GB)

(72) Inventor: Andrew Hind, Maidenhead (GB)

(73) Assignee: Hyland UK Operations Limited, Maidenhead (GB)

( * ) Notice: Subject to any disclaimer, the term of this patent is extended or adjusted under 35 U.S.C. 154(b) by 381 days.

(21) Appl. No.: 15/442,518

(22) Filed: Feb. 24, 2017

(65) Prior Publication Data

US 2018/0246969 A1 Aug. 30, 2018

(51) Int. Cl.
*G06F 17/00* (2019.01)
*G06F 16/901* (2019.01)

(52) U.S. Cl.
CPC .................................. *G06F 16/901* (2019.01)

(58) Field of Classification Search
CPC .............................. G06F 16/901; G06F 16/951
See application file for complete search history.

(56) References Cited

U.S. PATENT DOCUMENTS

| 2007/0214129 | A1* | 9/2007 | Ture | G06F 16/951 |
| 2010/0250706 | A1* | 9/2010 | Burckart | H04L 67/2885 709/219 |
| 2012/0078859 | A1* | 3/2012 | Vaitheeswaran | G06F 16/951 707/693 |
| 2014/0195525 | A1* | 7/2014 | English | G06F 16/951 707/722 |
| 2018/0218160 | A1 | 8/2018 | Wetherall et al. | |

* cited by examiner

*Primary Examiner* — Greta L Robinson
(74) *Attorney, Agent, or Firm* — Mintz, Levin, Cohn, Ferris, Glovsky and Popeo, P.C.; F. Jason Far-hadian, Esq.

(57) ABSTRACT

User permissions for a search on content managed by a content management system (CMS) can be evaluated in a search engine based on a user identity of a user providing a query input for the query rather than after return of an initial results set to the CMS or some other front-end application. The search engine can constrain possible results returned from a search for the query input using a content index of a plurality of content items maintained in a repository of the content management system. The constraining can include limiting the search engine from adding a content item of the plurality of content items to a permissions-filtered results set unless the evaluating of the user permissions and the search for the query input against the content index do not exclude the content item. Other aspects can support index updating by selective use of a metadata index.

20 Claims, 8 Drawing Sheets

EFFICIENT INDEX UPDATING IN A CONTENT MANAGEMENT SYSTEM

TECHNICAL FIELD

The subject matter described herein relates to indexing and searching of content items managed by a content management system.

BACKGROUND

Enterprise content management (ECM) covers a broad range of applications, including document management (DM), Web content management (WCM), records management (RM), digital asset management (DAM), search of managed content, and the like. A system for managing such content can be generally referred to as a content management system (CMS) and can be configured with features suitable for managing the various content items (also referred to herein in some examples as "files" or "documents") that an enterprise produces or generates, retains or otherwise stores, manipulates or modifies, etc. A CMS can support the requirements of one or more applications including DM, WCM, RM, DAM, search, etc., and optionally other requirements, to provide a coherent solution in which content processes, management processes, and the like are capable of accessing content across a variety of applications subject to access controls, permissions, and the like. Content (in the form of content items) managed by a CMS can include one or more of documents, images, photos, Web pages, records, XML documents, other unstructured or semi-structured files, etc. Content retained in a CMS can also include directory structures (also referred to as file structure hierarchies) such as folders, file trees, file plans, or the like, which can provide organization for multiple content items in addition to storing or otherwise representing relationships between content item, etc. Any kinds of content items can generally have metadata associated therewith. The metadata can include date or time information (last opened, last saved, created, disposal date, etc.) file size, location (e.g. where a photographic image was taken), information about creation or a current state or storage location of the content item (e.g. camera settings for a photo, IP addresses of computers that have previously been used to access the content item, network traffic histories, etc.), or any other information that may be desirable to store.

An "enterprise" can generally refer to an organization, such as for example a business or company, a foundation, a government, a university, a department or sub-organization of one of these entities, or the like, and can have content requirements related to one or more business processes, content uses, etc. Also, for the purposes of this disclosure, the term "document" may be used interchangeably to refer to any kind of content item that may be stored in or managed by a CMS. The terms "folder" or "directory" can refer to a logical organizing structure that can be used in a CMS to group or otherwise assist a user in browsing for documents stored in or otherwise managed by the CMS.

A CMS manages the actual digital binary content, the metadata that describes a context of each document, associations between a document and other content or documents, a place and classification of a content item in a repository, indexes for finding and accessing content items, and the like. The CMS can also manage processes and lifecycles of content items to ensure that this information is correct. The CMS can also manage one or more workflows for capturing, storing, and distributing content, as well as the lifecycle for how long content will be retained and what happens after that retention period.

SUMMARY

A CMS can be configured to maintain the security of content items managed by the CMS. One aspect of ensuring security of content items in a CMS can involve limiting access to certain content items (or groups of content items) to some subset of all of the users who can access the CMS. While in some examples content that is particularly sensitive may be encrypted such that users who lack the proper encryption key or keys cannot open, view, modify, or otherwise access the content, in other examples access restrictions may be additionally or alternatively handled by the use of access permissions, which can be applied to individual users or groups of users (e.g. according to designated roles within an enterprise) or processes that access data (e.g. business processes. A user lacking the proper credentials for a given content item is generally prevented from opening (or performing any other file actions on) that content item. In some examples, a user who lacks access permissions for a given content item may be prevented from being allowed to even "discover" a content item, which means that the content item is effectively hidden from view—in searches or in browsing to a folder or other file structure containing such a content item, the user should not even be given an indication that the content item exists.

Aspects of the current subject matter can relate to permissions-constrained operations and/or to indexing of content in a content management system. Various combinations of representative features are described in this section. These aspects are not intended to be limiting.

In one aspect, which can relate to enabling of dynamic faceting of search results in a CMS with application of permissions constraints within a search engine, a method includes evaluating user permissions based on a user identity of a user providing a query input for a search on content managed by the content management system. The evaluating occurs in a search engine associated with a content management system. The method further includes the search engine constraining possible results returned from a search for the query input using a content index of a plurality of content items maintained in a repository of the content management system. The constraining is based on the evaluating of the user permissions and includes limiting the search engine from adding a content item of the plurality of content items to a permissions-filtered results set unless the evaluating of the user permissions does not exclude the content item and the search for the query input returns the content item. The permissions-filtered results set is returned by the search engine along with permissions-corrected summary statistics representative of the permissions-filtered results set. The returning includes dynamically generating facets for grouping the permissions-filtered results set according to one or more faceting criteria. The dynamically generating includes use of the permissions-corrected summary statistics to calculate faceting relevant to the permissions-filtered results set.

In some variations of this aspect, one or more of the following features can optionally be included in any feasible combination. The evaluating of the user permissions based on the user identity of the user can include a search on a user permissions index for permissions granted to the user based on the user identity. The user permissions index can include an access control list index maintained by the search engine. The evaluating of the user permissions based on the user identity of the user can include searching an access control list index for access control lists designating the user identity as being allowed a sufficient level of access to content items assigned to those access control lists. The query input can include a partial query input that can include a string of characters entered by the user into a search term input user interface element in a user interface presented to the user. The returning the permissions-filtered results set can include presentation, in the user interface, of suggested content items based on the partial query input. A method can further include using the permissions-filtered results set to identify a projected query input based on the partial query input.

In another aspect, which can relate to enabling delivery of search results based on a partial query input for a search on a CMS with application of permissions constraints within a search engine, a method includes a search engine associated with a content management system evaluating user permissions based on a user identity of a user providing a partial query input for a search on content managed by the content management system. The partial query input includes a string of characters entered by the user into a search term input user interface element in a user interface presented to the user prior to an indication from the user that query inputting is completed. The method further includes the search engine constraining possible results returned from a search for the partial query input based on the evaluating of the user permissions and using a content index of a plurality of content items maintained in a repository of the content management system. The constraining includes limiting the search engine from adding a content item of the plurality of content items to a permissions-filtered results set unless the evaluating of the user permissions does not exclude the content item and the search for the partial query input returns the content item. The method further includes the search engine returning the permissions-filtered results set with permissions-corrected summary statistics representative of the permissions-filtered results set. The returning of the permissions-filtered results set includes presentation, in the user interface, of suggested content items based on the permissions-filtered results set for the partial query input.

In some variations of this aspect, one or more of the following features can optionally be included in any feasible combination. A method can further include using the permissions-filtered results set to identify a projected query input based on the partial query input for presentation to the user via the user interface. The evaluating of the user permissions based on the user identity of the user can include a search on a user permissions index for permissions granted to the user based on the user identity. The user permissions index can include an access control list index maintained by the search engine. The evaluating of the user permissions based on the user identity of the user can include searching an access control list index for access control lists designating the user identity as being allowed a sufficient level of access to content items assigned to those access control lists. The returning can further include dynamically generating facets for grouping the permissions-filtered results set according to one or more faceting criteria. The dynamically generating can include use of the permissions-corrected summary statistics to calculate faceting relevant to the permissions-filtered results set.

In yet another aspect, which can relate to efficient index updating in a CMS, a method includes indexing metadata for content items stored in a repository of a content management system. The indexing results in a current metadata index of the content management system. The method further includes adding the current metadata index to a content index of the content management system which indexes content managed by the content management system, identifying a set of content items in the repository that have undergone a change to content based on the metadata index, updating the content index for the set of content items without initiating a full re-indexing of the content of the content management system, and merging the current metadata index and the updated content index into a full content index for the content management system.

In some variations of this aspect, one or more of the following features can optionally be included in any feasible combination. The merging can occur in response to a scheduled or triggering event. A method can further include generating a result set identifying matching content items in the content management system that match a query input, accessing text of a matching content item from the result set using metadata of the matching content items, returning textual context for a term of the query input from the content item, and displaying the textual context with the term highlighted via a user interface. A method can alternatively or additionally further include updating a content cache storing a full text copy of content items managed by the content management system concurrently with the content index. The accessing of the text of the matching content item can include performing a lookup in the content cache based on the metadata. The accessing of the text of the matching content item can include directly accessing the matching content item in the repository of the content management system. The generating of the result set can be performed by a search engine associated with the content management system, and a method can further include evaluating user permissions in the search engine based on a user identity of a user providing the query input, and constraining the result set by the search engine based on the evaluating of the user permissions. The constraining can include limiting the search engine from adding a content item of the plurality of content items to the result set unless the evaluating of the user permissions does not exclude the content item.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a content management system, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Modern content management systems commonly include functionality that allows a user to perform searches for documents or folders stored within or otherwise managed by the CMS. Such search functionality can include a text entry box into which a user can enter one or more search terms to trigger retrieval of documents or folders. The specifics of a user interface for entry of search terms and display of retrieved documents or folders (or links or other references to such retrieved content) are not key to the disclosed subject matter. Any user interface suitable for search of content in a CMS and for conveying information about the retrieved content can be consistent with the implementations of the current subject matter described herein provided such a user interface supports one or more of the described features and functionality.

As noted above, an important function of a CMS, particularly one used for storing and managing content related to an enterprise environment, can be proper handling of user permissions for accessing, viewing, reading, writing, modifying, etc. content stored in and/or managed by the CMS. One approach for handling user permissions or other access controls for documents in a CMS can include use of access control lists (ACLs). An ACL can be considered as an ordered list of access control entries (ACEs), each of which associates a single authority to a single permission group or permission, and states whether the permission is to be allowed or denied. Nodes (e.g. nodes on a directory hierarchy such as a folder, sub-folder, document, etc.) in a CMS can include an associated ACL. In general an ACL specifies if it should inherit ACEs from an ACL associated with a parent node. An ACE generally includes an authority, a permission, and a deny/allow flag. While the examples described herein make general reference to ACLs, other approaches to handing of user permissions relative to content items in a CMS are also within the scope of the current subject matter.

Figure 1:
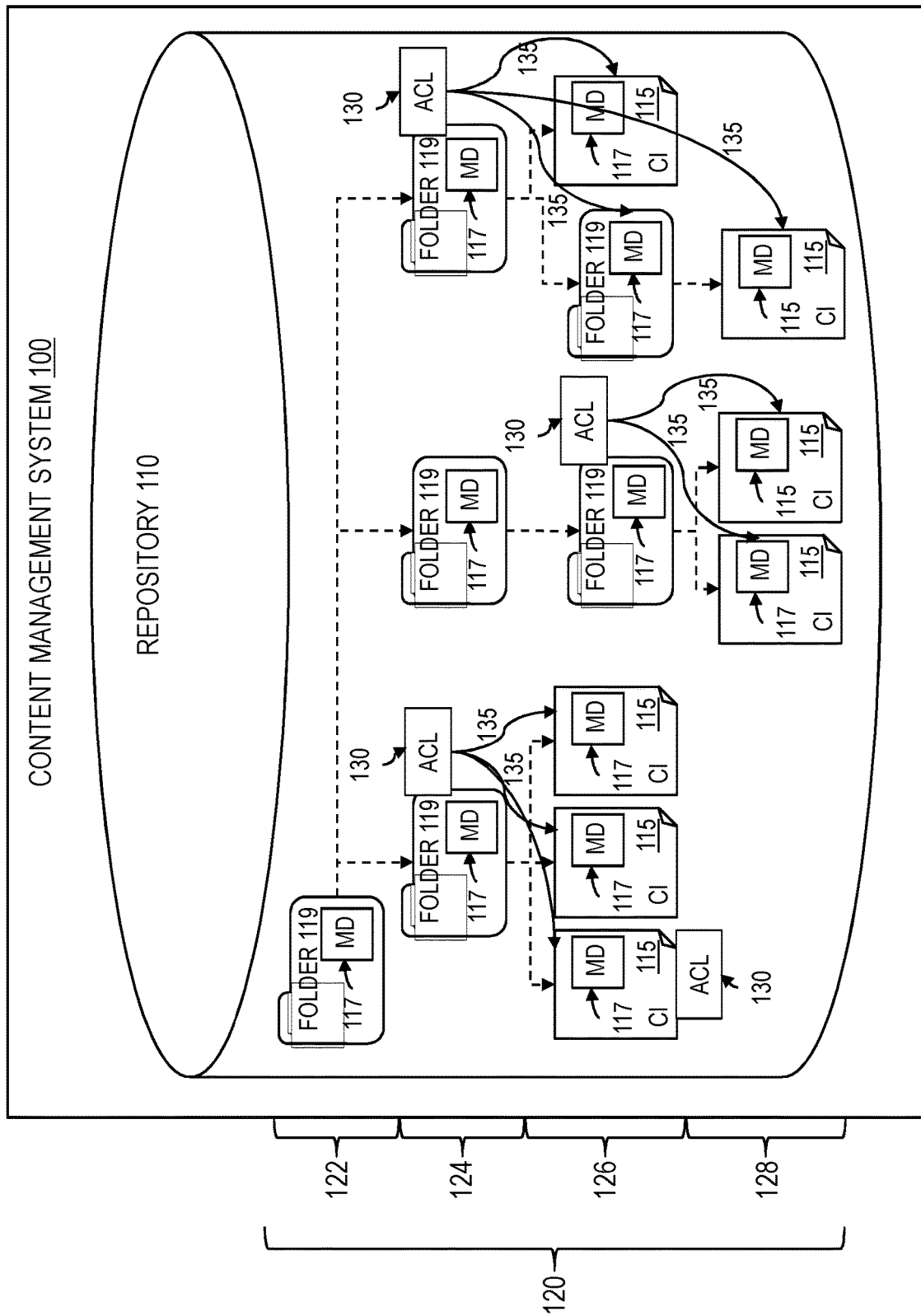
FIG. 1 shows a diagram illustrating features of a content management system consistent with implementations of the current subject matter.

FIG. 1 shows a diagram illustrating components of a CMS 100 illustrating how various features discussed herein, such as for example ACLs, ACEs, content items, folders, and the like, may interact or operate consistent with implementations of the current subject matter. A CMS installation 100 manages a repository 110. The CMS 100 can be implemented as software or other code running on one or more computing systems each of which includes one or more programmable processors. The repository 110 includes physical storage for the content items (e.g. optical, magnetic, solid state, or other storage devices), which can optionally be part of one or more computing system implementing the CMS. Alternatively, the repository and the content stored therein can be managed by a CMS implemented on one or more computing systems that are remote from one or more computing systems that include the physical storage upon which the content items are stored.

The repository 110 stores content, including content items 115, which can also include associated metadata 117 as well as the content itself. The content items 115 can be organized according to a file structure hierarchy 120, which can optionally be a folder tree having one or more folders 119 or other structures defining one or more levels of file structure hierarchy as illustrated in FIG. 1. Folders 119 or other structures defining levels of a hierarchy are also considered as content items (as noted above), and therefor also include associated metadata 117. In the example illustrated in FIG. 1, the file structure hierarchy 120 includes four levels: a top level 122, and lower levels 124, 126, and 128. One or more of the levels 122, 124, 126, 128 of the hierarchy can have a reference to an associated ACLs (also referred to as an ACL reference 130). Alternatively, ACLs or other permissions can be handled via relational database entries, for example with each ACL or other designator of user permissions for access to content items, folders, etc. having database records associated with it for each content item, folder, etc. that is associated with that ACL or other permission designator. One or more individual content items can also be associated with one or more ACLs (which henceforth in this disclosure are summarized merely as ACLS). In general, an ACL associated with a folder can propagate to any sub-folders within the folder as well as any content items in the folder or in the sub-folders. For example, the ACL associated with a folder 119 can be also associated with content items 117 or other folders 119 at a lower hierarchy level that are contained within in that folder. This association can be represented by an ACL link 135, which can be explicit or implicit. These ACLs 130, or alternatively other definitions of access permissions (which are also consistent with the current subject matter) include restrictions imposed on a level of access granted to a given user with regards to the user interacting with a given content item (or items) managed by the CMS 100.

The level of access can include one or more of full access, read only, no access, discoverable only, or other possible options. Full access generally imposes no restrictions on the ability of the user to perform actions such as read, view, edit, delete, copy, download, etc. on the content item. Access controls can optionally restrict one or more of these permissions for a user relative to the content item. A full restriction would be no access—the user is not allowed to even see that the content item exists. For example, the content item may be hidden from appearing in search results despite matching query criteria or search terms, etc. or may be invisible when a user navigates to a folder or other file structure including such a content item for which the user lacks the necessary access. "Discoverable only" can mean that the content item may appear as a result of a search or within a folder that a user navigates to, but the user would not be able to open, download, or perform any other actions on the content item. In some examples, a discoverable only file can appear in the user interface as greyed out or otherwise non-selectable. Such a designation can refer to content items or file hierarchy structures that a user is able to find by searching on metadata or the like, but whose content the user is not allowed to access. In an example, a user viewing a set of search results or browsing to a folder or other organizational structure that includes a content item for which the user does not have the appropriate restriction mark or marks but which has a "discoverable only" setting, the presence of the content item may not be hidden from the user, but no other actions can be taken by the user on the content item.

When a user initiates a search on the CMS, the results displayed to the user (e.g. via a user interface view) desirably include only those content items that a) match any search terms or other criteria provided by the user and b) are accessible to the user. Accessible to the user means that the user is at least capable of discovering a content item. If the user specifies, or if other settings of the CMS so indicates, the results displayed may desirably be limited to only those content items for which the user has a more permissive level of access than merely discoverable only. If the user's level of access to a content item is no access (or some other level of access that prevents the user from even discovering (or otherwise being made aware) of a content item, that content item should desirably not appear in a results set generated in response to a search, query, or file structure navigation request by the user that would otherwise have resulted in display of the content item as a search or query result or as being contained within a folder or other file structure that the user has reached.

Figure 2:
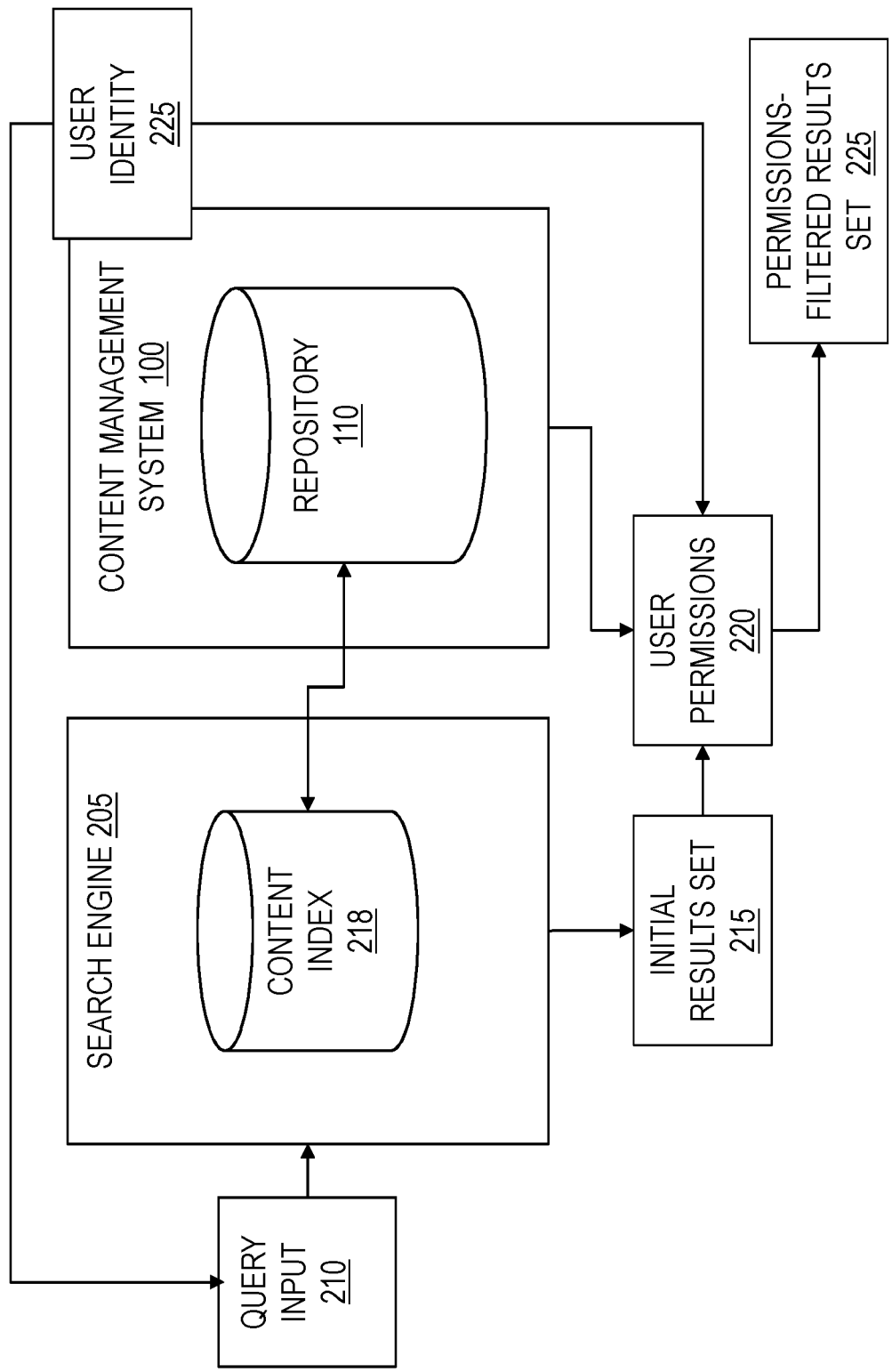
FIG. 2 and FIG. 3 show diagrams respectively illustrating application of permissions after generation of an initial results set according to a conventional approach and within the search engine such that a permissions-filtered results set is generated directly.

A typical database search engine generally accesses all results meeting the query parameters and then performs a post-retrieval evaluation of the results before providing those results to the query originator. One example of a search engine typically employed in enterprise content management systems is the Solr search platform available from the Apache Software Foundation (Forest Hill, Md.). In conventional approaches, for example as illustrated in FIG. 2, a search engine 205 may evaluate the search terms and/or other criteria provided by a user (e.g. a query input 210) to determine an initial results set 215. The determining of the initial results set 215 generally includes a query against one or more content indexes 218 of the CMS repository 110 to identify those content items having indexed content and/or metadata that matches the query input 210. The initial results set 215 can then be limited by the CMS 100 or other front end application by evaluating and applying user permissions 220 relative to a user identity 225 to eliminate those content items included in the initial results set but not accessible to the user to thereby produce a permissions-filtered result set 230. Evaluation of user permissions can include evaluating whether to allow or deny access to a content item; whether a user has necessary ownership rights of the content item (e.g. as may be implemented in a records management environment, etc.), whether any security restrictions or classifications, caveats, supplementary markings, etc. are applicable that may prevent user access to the content item; or the like. Caveats can generally refer to a designation applied to a content item or other file structure or to a user to indicate some type of security-based (or other) of restriction on possible user access to that content item or file hierarchy structure on top of more traditional security or clearance markings. A non-limiting example of the use of caveats is described in co-pending and co-owned U.S. patent application Ser. No. 15/423,521, the disclosure of which is incorporated herein by reference.

In some implementations of the current subject matter, a search engine 205 associated with a CMS 100 can include features relating to strategic evaluation of permissions of the query originator (e.g. a human user entering query terms into a search box or other user interface element, an application from within which a query is generated under direction from a logged-in user, or the like) making a query request within the search engine 205. This approach can enable generation of permissions-filtered result set 230 that is already limited to only those results that are actually available to the query originator (e.g. the user) directly within the search engine 205 rather than requiring any post processing by the CMS 100 or other front-end application.

Figure 3:
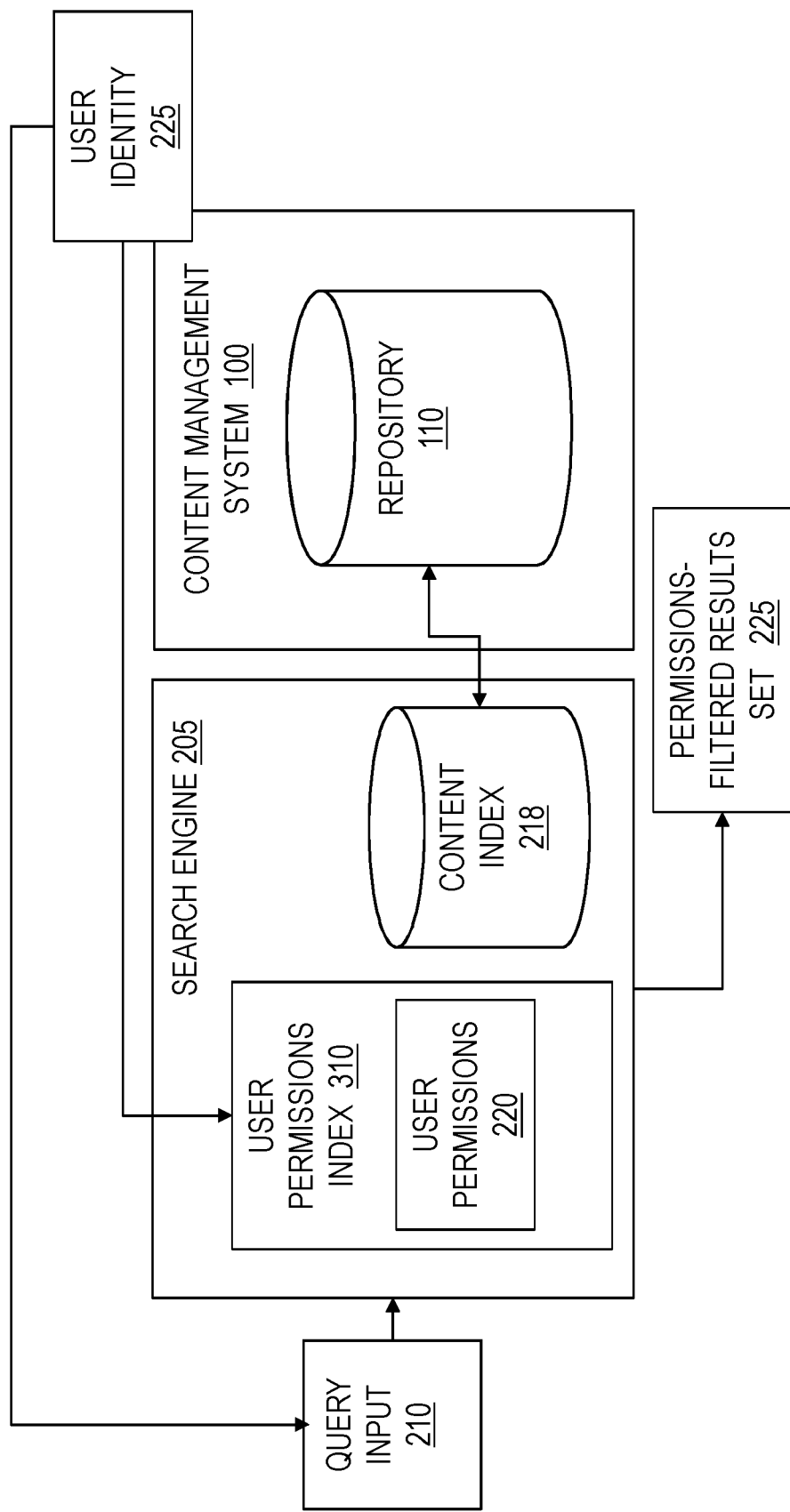

In other words, consistent with implementations of the current subject matter and as shown in the example of FIG. 3, upon receipt of the query input 210, the search engine 205 can perform evaluation of the user permissions 220 as part of directly producing a permissions-filtered result set 230 without the need for post-pressing of permissions evaluation by the CMS 100 or some other front end application. To accomplish this outcome, which can provide significantly quicker and more dynamic search results, a user permissions index 310 that correlates or otherwise associates user permissions 220 with those content items maintained in the CMS repository 110 or managed by the CMS 100 to which the user permissions 220 are applicable can be employed. The user permissions index 310 can be included in the evaluation of the query by the search engine 205 such that the search engine 205 evaluates the user permissions index 310 against the user identity 225 to filter on those content items that the user could feasibly be allowed to see in a permissions-filtered results set in addition to evaluating the query input 210 provided by the user. The evaluation of the user permissions index 310 against the user identity 225 can optionally involve searching an ACL index for those ACLs designating the user identity as "access allowed" at a sufficient level of access to permit the user to at least discover, or optionally at least interact with (e.g. by opening, viewing, moving, editing, deleting, downloading, etc.) those content items assigned to such ACLs. The content index or indexes 218 used by the search engine 205 for evaluating the query based on the query input 210, such as for example a content index, a metadata index, etc., can then be filtered (e.g. a search on the content index 218 can be constrained) to only those entries relating to content items that appear on the ACLs identified in the search of the ACL index. It will be understood that other implementations of user permission indexes (e.g. besides an ACL index as described above) are also consistent with features of the current subject matter.

In another example implementation of the current subject matter, the query input 210 can be evaluated first by the search engine 205 before searching the user permissions index 310. Alternatively, the evaluations of the query input 210 against the one or more content indexes 218 can optionally occur effectively concurrently with the evaluation of the user permissions index 310 against the user identity 220 and the results of the these two evaluations can be combined by operation of the search engine 205 to directly produce the permissions filtered results set 230 without a need for any post search engine processing of an initial results set 215 by the CMS 100 or some other front end application.

The approach of evaluating user permissions directly within the search engine 205 described herein can be employed to supply one or more of several possible benefits or advantages, a few of which are described in more detail below. Consistent with implementations of the current subject matter, several advantageous features can be realized as a result of evaluating permissions of a query originator within the search engine rather than filtering an initial results set based on those permissions as an intermediate step between query result retrieval and display of those results to a query originator. Among possible benefits or advantages of an evaluation of user permissions within a CMS search engine 205 consistent with implementations of the current subject matter, such an approach can support dynamic faceting features, live search results provided during user entry of only part of the query input 210, or the like.

Faceting of query or search results generally refers to clustering of items or search results into categories that let users drill into search results (or even skip searching entirely) by any value in any field (e.g. an attribute, criterion, etc.). A displayed facet can show a number of hits within the results set generated by the query that match the category within the facet. As an example, a results set can be faceted on file size, and the categories into which the data can be divided based on the file size facet can be less than 50 kbytes, 50 kb to 200 kbytes, 200 kbytes to 1 MB, and greater than 1 MB. A user can "drill down" by applying specific constraints to the search results. This kind of faceting of query or search results can also be referred to as faceted browsing, faceted navigation, guided navigation, parametric search, etc.

The live or "dynamic" faceting features discussed herein can, in some implementations of the current subject matter, be implemented as follows. In existing approaches, faceting of search results can occur on predetermined criteria. For example, an application for searching on content relating to a shopping website could be configured to automatically facet returned data according to pre-determined groupings of values on one or more variables. Such pre-determined groups could include, for example, pre-defined price ranges (e.g. less than $10, $10 to $25, $25-$100, and more than $100), pre-defined ranges of expected delivery dates (e.g. within the next day, the next 1-3 days, 4-10 days, more than 10 days, etc.) or other binning criteria that can be pre-configured based on the expected types of values to be returned. However, a CMS 100 that manages all content produced or maintained by a multi-modal enterprise may include a sufficiently varied scope of types of content that the use of pre-defined faceting criteria may result in less useful or even non-sensical faceting of the data. Some existing approaches may include user-configurable facets (e.g. by presenting via a user interface one or more controls that enable a user to select which criteria to facet on and/or to choose how the bins used for the faceting on a given criterion or criteria are defined).

In the aspect of the current subject matter relating to dynamic faceting, features of the results set, or more specifically, the content items in the results set, are used to determine which facets are likely to be of interest. While predetermined facets can be presented as an option or as a default, dynamic faceting based at least in part on actual content or metadata of the content items returned in a query can improve a user experience.

Drilling down can be accomplished as follows. For each facet displayed to a user, for example in a search pane of a user interface, a list of values which appear in the results set as well as the number of content items containing each value are presented. Selecting one of the values can cause a filtering of the search results to those documents containing the value. The facets pane can then be updated to the new search result. The facet fields and the number of content items for each value can be updated to those appearing in the filtered result.

The ability to provide automatic, dynamic faceting of content items returned in a permissions-filtered results set 225 can be a desirable feature in a CMS 100 that handles a variety of content. Such a feature may be readily enabled if there is no need to evaluate user permissions for the content items returned in a results set for a given query input 210, in that the search engine 205 can provide summary statistics (e.g. ranges of one or more parameters characteristic of the generated results set and counts of retuned content items occurring within various ranges of such parameters) usable by the CMS 100 or other front end application to intelligently determine how to assign ranges for a set of bins into which the returned search results are to be faceted. However, when a search on content items managed by a CMS 100 is subject to application of user permissions to determine which content items both match the query input 210 and are compatible with user permissions 220 evaluated against the user identity 225 of the user providing the query input 210, the summary statistics provided by the search engine 205 may result in non-useful faceting outcomes. For example, a query input might return an initial results set 215 with summary statistics representative of the content items included in the initial results set 215. However, the application of user permissions 220 to the initial results set 215 may cause those summary statistics to no longer be reasonably representative of the content items remaining in the resulting permissions-filtered results set. Accordingly, any determination of dynamic faceting ranges (i.e. definitions of bins into which the results in the permissions-filtered results set 225 are to be separated according to one or more criteria) may not occur in a manner that is logical or useful to a user. In an example, suppose a query input returns a large number of larger documents or of a certain type of content items, but those returned content items are disproportionately content items for which the user has restricted access. When the restricted access content items are removed from the initial results set 215 returned by the search engine in by the application of the user permission 220, the permissions-filtered results set would have a skewed distribution of content items having the faceted criteria relative to the summary statistics returned by the search engine. This outcome can cause the presented number of content items having the presented values to be incorrect, and can even cause values to be listed that do not appear in any content items available for access by the user to be included in the list of values.

The above-described approach of evaluating user permissions using a user permissions index 310 within the search engine 205 can address this issue that may arise with previously available approaches. In this aspect of the current subject matter, which can optionally be included in combination with features of other aspects described herein, features relating to dynamic generation of facets for results generated by a query on access permission controlled content stored in a CMS can be included. As a general feature, a query input 210 is received from a user. As noted above, the query input 210 can be directly entered by a user into a user interface element such as a text box, pull-down menu, or the like. Alternatively or in addition, a query can be initiated by an application that accesses the content stored in a repository 110 that is part of or otherwise maintained or managed by the CMS 100, either automatically or in response to some user input.

Figure 4:
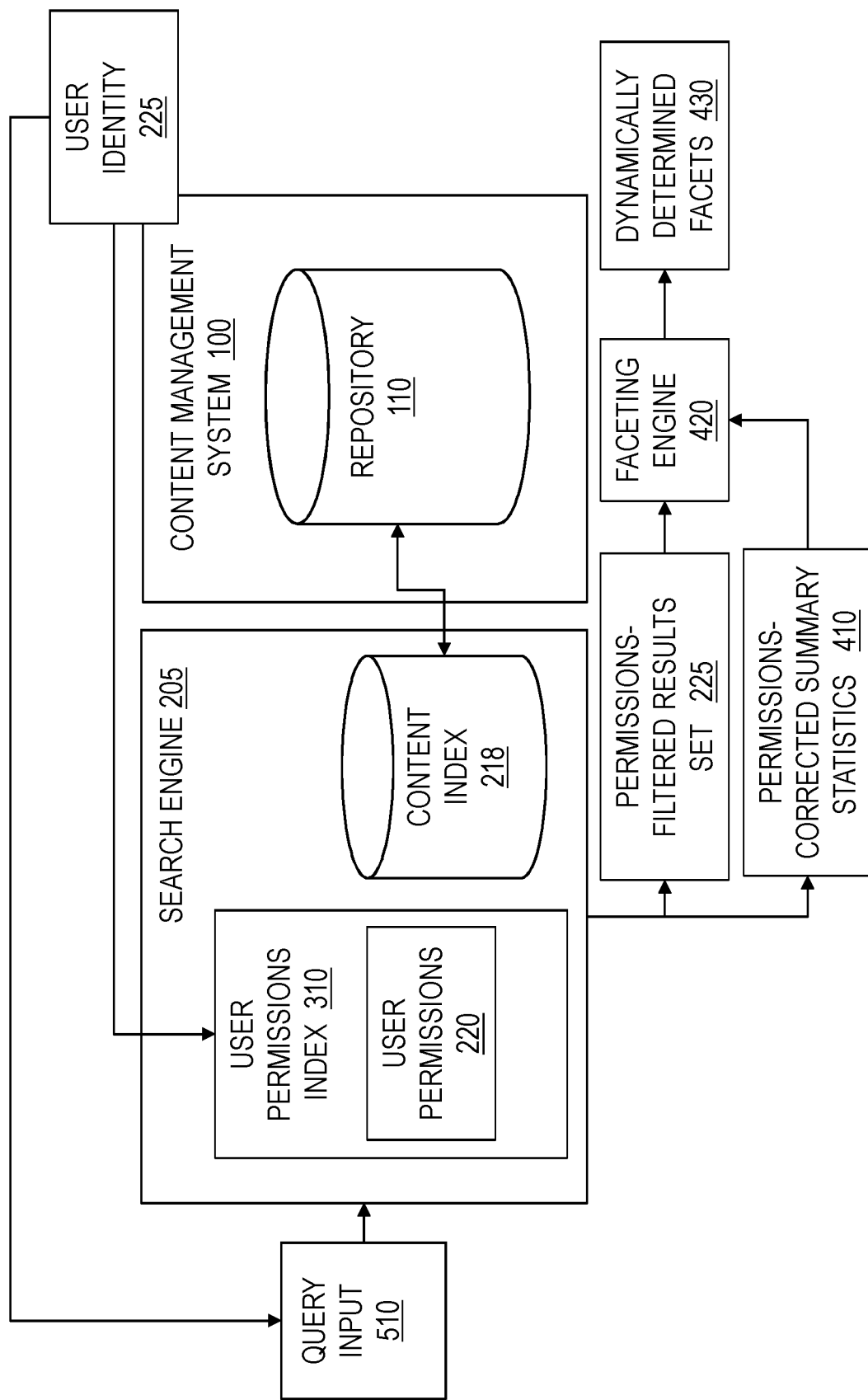
FIG. 4 shows a diagram illustrating features of an approach consistent with implementations of the current subject matter for providing dynamically determined faceting on search results from a content management system with user permissions applied.

As illustrated in FIG. 4, permissions-corrected summary statistics 410 produced by the search engine using the approach illustrated in FIG. 3 to be representative of the permissions-filtered results set 225 are applying through a faceting engine 420, which can be part of the CMS 100 or some other front end application to calculate results-relevant faceting 430 (i.e. using binning on one or more criteria that are relevant to the permissions-filtered results set 225 with ranges that divide) the permissions-filtered results set 225 into usable groupings dynamically determined facets to allow a user to effectively drill down into the results. In other words, the presented list of values appearing in the permissions-filtered results set 225 is generated directly from the search engine via evaluation of user permissions (e.g. using a search on the user against a user permissions index 310 as well as a search on the query input 210 against the content index 218.

In another aspect of the current subject matter, the evaluation of user permissions dynamically within a search engine 205 can also support provision of live search results during user entry of a query input 210. This feature represents an additional area in which post-search engine evaluation of user permissions as in currently available approaches can result in less than optimal results. Many users are familiar with the beneficial features of popular search engines that result in rapid display of preliminary search options (e.g. text to finish a query input or even a list of suggested results that is populated and successively updated with potentially more accurate results as the user enters more and more characters of a query input 210 into a search term input box. Such a feature generally relies upon the search engine performing a lookup against its content index to identify potentially matching hits. However, in the cases described above in which the content index 218 is used for finding content items in a CMS repository 110 that match the query input with resolution of any applicable user permissions occurring afterwards, and generally not within the search engine 205, there is a high likelihood of a user being shown suggested query completion hints or suggested results that the user is not actually allowed to access.

Figure 5:
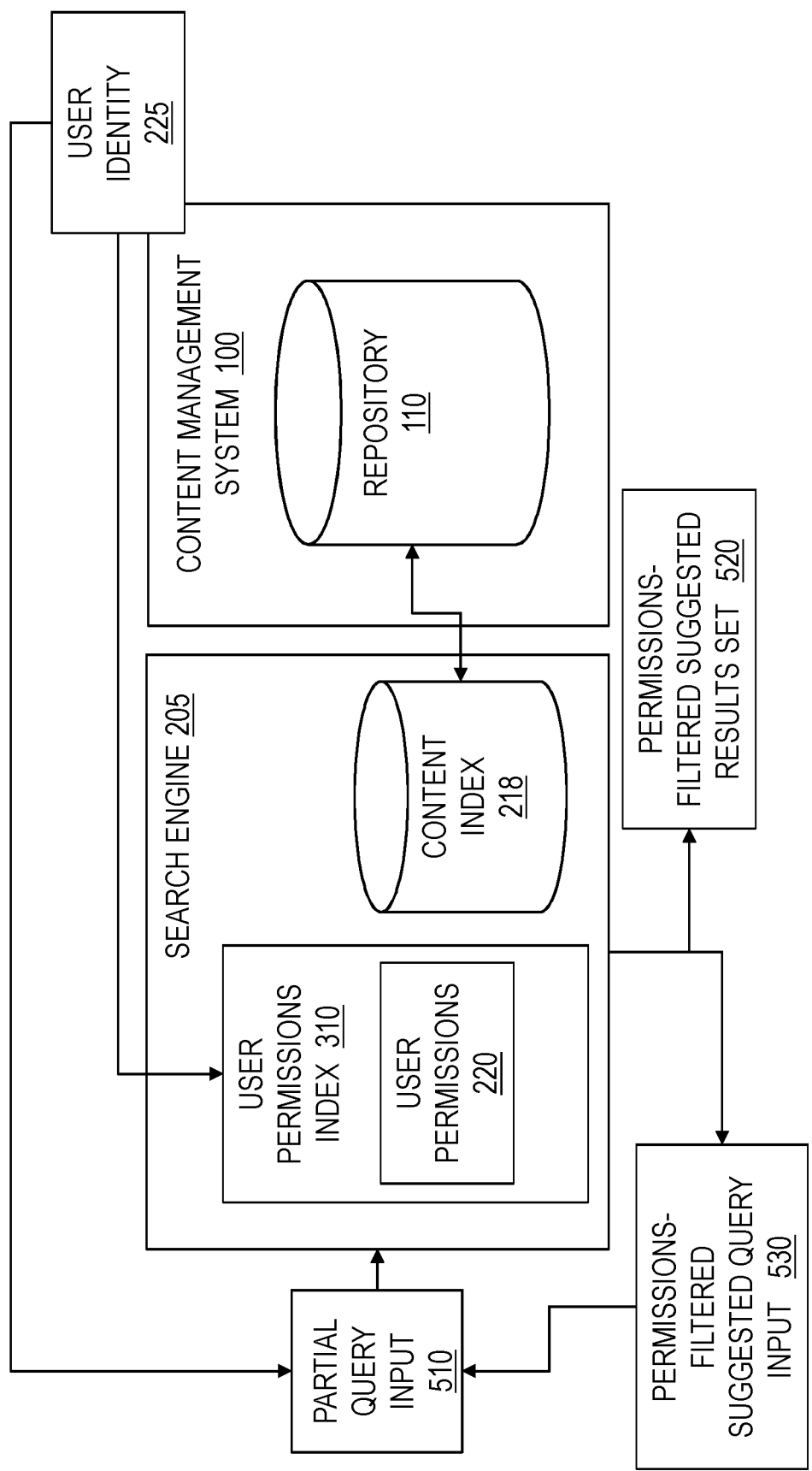
FIG. 5 shows a diagram illustrating features of an approach consistent with implementations of the current subject matter for providing suggested results sets and/or suggested query inputs for partial query string searches on a content management system with user permissions applied.

This issue can be addressed using an approach with similarities to that illustrated in FIG. 3. As shown in FIG. 5, a partial query input 510, such as for example can be received via a search term input user interface element in a user interface presented to a user. The CMS 100 or other front end application that manages the user interface can include criteria for determining a number of characters of entry are required to trigger a suggested results feature that results in generation of either or both of a suggested results set 520 or a set of one or more query suggestions 530 for how the query input might be completed.

For generating a permissions-filtered suggested results set 520, the search engine can perform a full lookup on the content index 218 as well as the user permissions index 310 to determine a set of content items that are to be returned based on whatever string of characters has been input by the user into the search term input user interface element. In some examples, the permissions-filtered suggested results set 520 can be generated whenever a pause in entry by the user of a search string is detected. For example, a pause in typing of more than a half second (or any other relevant or threshold time period, which can be preset or user-defined) can be detected and used as a signal to generate the permissions-filtered suggested results set 520. Such a pause, or other criteria, can be used to trigger generation of results based on the partial query input. The pause or other criteria do not represent an explicit indication from the user that query inputting is completed. The generation of the permissions-filtered suggested results set can occur in much the same manner as is described above in reference to FIG. 3. As multiple permissions-filtered suggested results sets 520 may be generated on a entry of a single full query input (e.g. if the user pauses more than once), speed of generation of a given permissions-filtered suggested results set 520 as well as efficiency in use of system resources can be maximized, in some examples, by use of a pre-evaluation of the user permission index for those permissions groups (e.g. ACLs) for which the user identity 225 indicates allowed permissions and then use of this evaluation as a filter on the content index 218 such that the partial query input 510 need not be searched against the entirety of the content index 218.

Generation of a permissions-filtered suggested query input 530 can proceed in a similar manner except rather than presenting a listing of suggested content items, the search engine 205 can evaluate the outcomes of possible, contextually logical strings of characters that may follow the partial query input 510 that is already received. In other words, the partial query input can be processed to identify multiple next sets of characters that might logically follow the already-entered character string. This processing can include application of a natural language model, a dictionary consistent with the language of the partial query input, or the like to identify likely character strings that might be next entered by the user. Each of these multiple possible next sets of characters can be, in turn, combined with the already provided partial query input 510 to generate a set of projected query inputs. A permissions-filtered results sets can be generated for each such projected query input, and the projected query inputs can be presented to the user as suggested, permissions-filtered suggested query inputs 530 with a ranking applied based on one or more criteria applied to the permissions-filtered results set generated for each projected query input. One example of a ranking consistent with implementations of the current subject matter can involve giving higher ranking to those projected query inputs returning a smallest non-zero permissions-filtered results set. Alternatively, a ranking of the permissions-filtered results set for the projected query inputs can be based on recentness of access (e.g. by the user or by other users) of the content items in the generated permissions-filtered results sets. Any other criteria for ranking the permissions-filtered results sets resulting from the projected query inputs is also within the scope of the current subject matter.

Selection by the user of one of the projected query inputs can result in an immediate (or near immediate) return of the appropriate related permissions-filtered results set 520 for that projected query input.

In some further implementations of the current subject matter, a CMS 100 (or optionally a query management component of a CMS 100), a front end application, or the search engine 205 itself can evaluate one or more features of a query input and/or some measure of current system resource usage to how to execute the query with evaluation of user permissions in a most efficient manner. For example, if the features of a query input 210 (e.g. an estimated number or, optionally, an actual number of content items likely to be returned via execution of search using the query input 210) indicate that a results set returned by execution of the query will be larger than a threshold size, the CMS 100 (or optionally a query management component of the CMS) or the front end application or search engine 205 can determine that a most efficient execution includes evaluation of user permissions by the search engine. In other words, user permissions can be added as additional terms or criteria to be evaluated by the search engine 205 as discussed above in reference to FIG. 3. While this decision may result in the query itself requiring more system resources to execute, post-query processing to remove content from the results set for which the user does not have an adequate level of access can be eliminated. In this manner, the overall use of system resources may be reduced. Additionally, elimination of a need for post-query processing can enable faster and/or more responsive behavior of the query result user interface. For a query input 210 that is estimated to return a results set that is smaller than the threshold size, user permission can be evaluated post-query, for example by the CMS 100 itself or by a front end application.

In one example of this faster and/or more responsive behavior, determination of dynamically generated faceting criteria can proceed immediately upon return of a results set rather than being required to wait for post-query processing.

Figure 6:
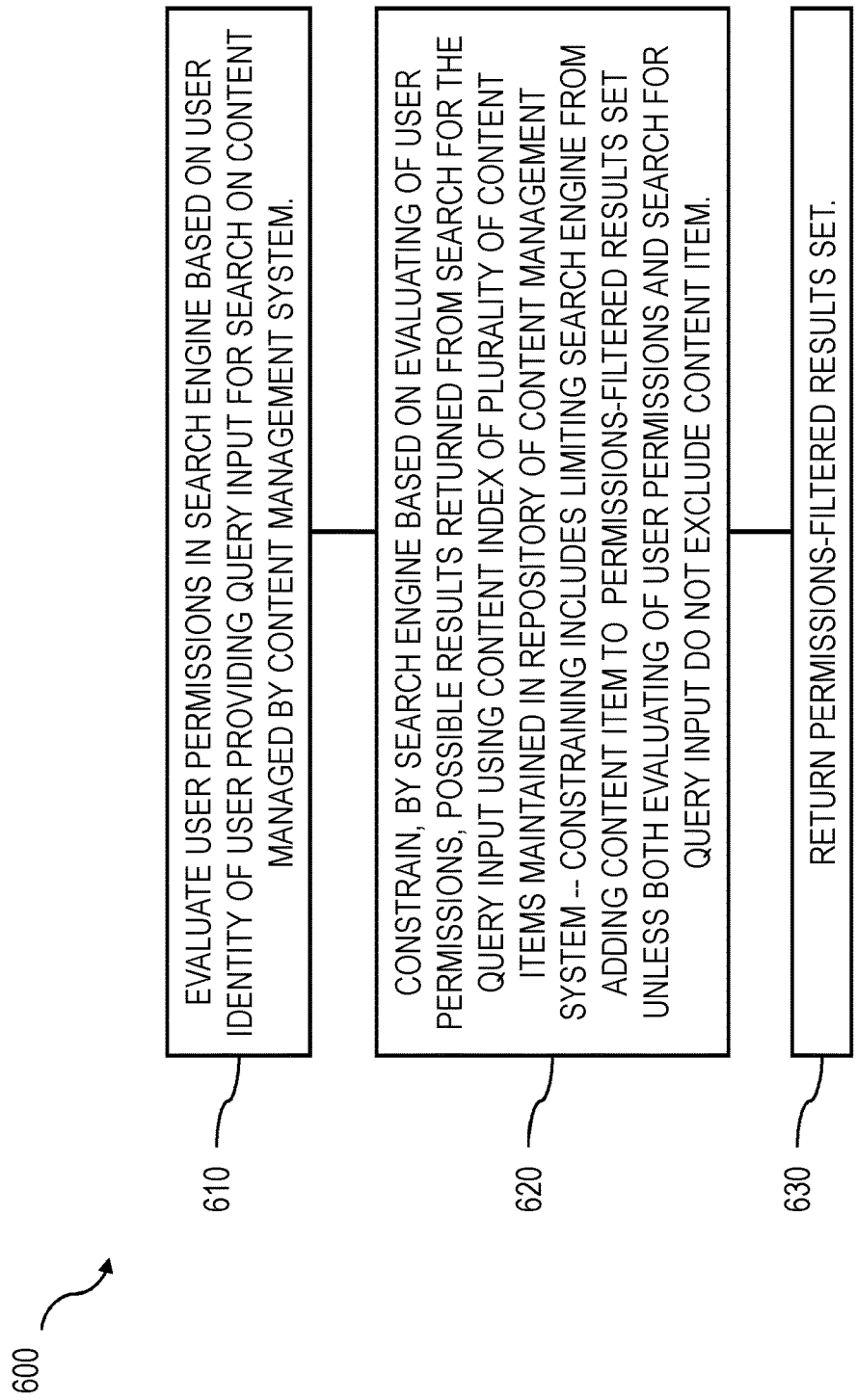
FIG. 6 shows a process flow diagram illustrating aspects of a method for evaluating user permissions in a content management system having one or more features consistent with implementations of the current subject matter.

FIG. 6 shows a process flow chart 600 illustrating features of a method consistent with implementations of the current subject matter. At 610, user permissions are evaluated in a search engine based on a user identity of a user providing a query input for a search on content managed by a content management system. The search engine constrains, at 620, possible results returned from a search for the query input using a content index of a plurality of content items maintained in a repository of the content management system based on the evaluating of the user permissions. The constraining includes or involves limiting the search engine from adding a content item of the plurality of content items to a permissions-filtered results set unless the evaluating of the user permissions and the search for the query input do not exclude the content item. The permissions-filtered results set is returned at 630.

Another potential challenge in usability of and efficient consumption of computing resources by a CMS 100 can involve updating of the content index 218 of the content items stored in one or more repositories 110 managed by a CMS installation and/or the metadata associated with those content items.

Indexing of the content items 115 and their associated metadata 117 in a CMS repository 110 can improve searches, provide alternative ways to organize information stored or managed by the CMS 100, and the like. As noted above, a content index 218 can support the ability for users to quickly and efficiently access content items stored in the repository 110 managed by the CMS 100. A content index 218 can also be used to provide very fast partial query or search results, for example to generate "as you type" results that populate upon entry by a user of one or more characters in a search string. As used in this description, a user may refer to an person who enters one or more search terms as part of a query input 210 directly via a query input feature of a user interface or via an application. Alternatively, the user can refer to an application that initiates a query on a CMS repository without direct human input. In general, a user is some entity that requests identification and/or retrieval of content items meeting one or more search or query criteria.

Automated indexing and/or classification approaches are generally capable of extracting data for indexing, categorizing, transferring, etc. autonomously. Automatic classification or categorizing can be based on the information contained in or otherwise associated with content items in the CMS and can be used for evaluating information based on predefined criteria, as part of a self-learning process, etc., as well as via a combination of one or more approaches. In general, maintaining a useful (e.g. reasonably up to date, accurate, etc.) content index 218 of the content of a CMS 100 that manages a large store of content items can impose a heavy computing load. For example, a typical approach to constructing a content index 218 involves the use of a crawler program that traverses a relational database structure of the CMS repository 110, typically via a series of queries and/or lookup requests. For a CMS 100 managing a very large pool of content items 115, updating of the content index 218 can require accessing a large number of database records on a regular basis.

Figure 7:
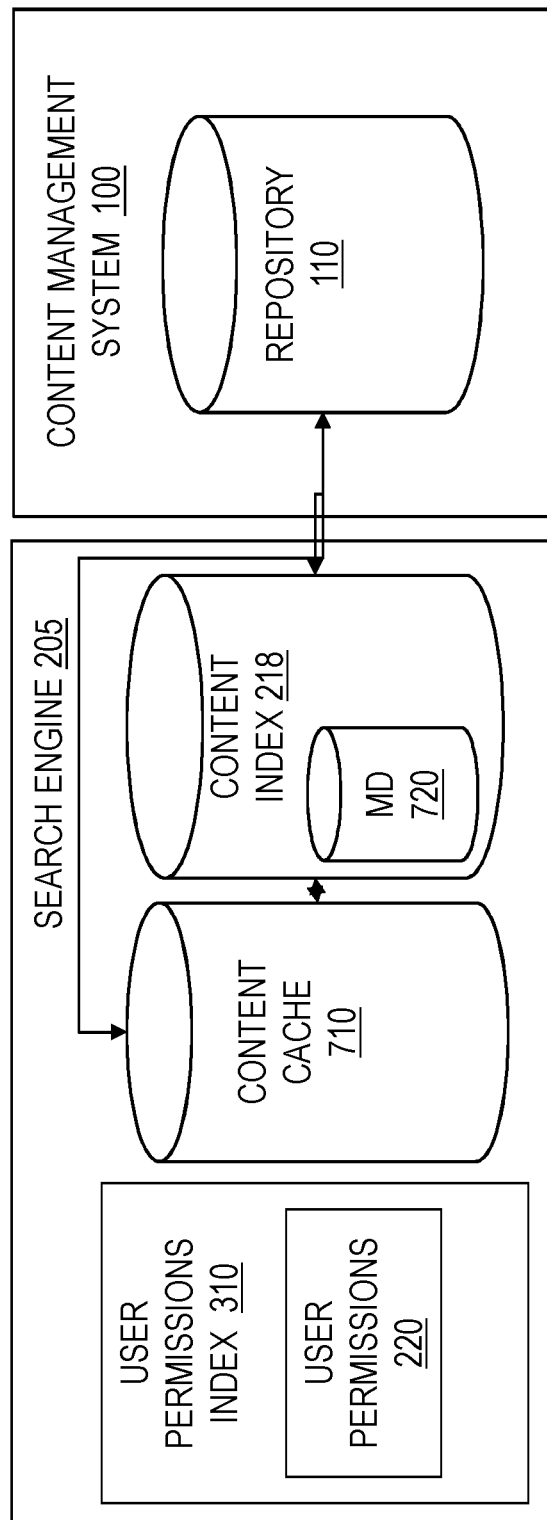
FIG. 7 shows a diagram illustrating features of an approach consistent with implementations of the current subject matter for updating a content cache in a search engine associated with a content management system.

The content index 218 can include both information about the content items 115 themselves (e.g. terms found in a text file, etc.) and metadata 117 reflecting other information about the content (e.g. relevant dates such as creation dates, edit dates, dates on which a content item has been accessed; file size; file type; or the like). The information about a content item 115 itself can, in some examples, include a cached, full text copy of the textual content of the content item 115 in the repository 110. This full text copy can also be referred to as a content cache, which can be maintained or otherwise made accessible at the search engine. The content cache can be quite useful in supporting features such as term hit highlighting, which typically rely on having a rapidly accessible, high speed cache of content. Term hit highlighting includes providing excerpts with returned search results to show where the search terms of a query input 210 occur within a particular field of a matching content item in the results set. FIG. 7 shows a diagram illustrating features of a CMS 100 and an associated search engine 205 in which the search engine 205 includes a content index 218 and a content cache 710, either or both of which can be updated periodically via a crawl of content items in the repository 110.

Refreshing of a content cache 710 and/or a content index 218 of a CMS repository 110 can be a resource-intensive process because doing so generally requires crawling all content items in the CMS repository to construct the index and/or update the content cache. The content index 218 and/or content cache 710 can include both metadata and content information about content items in the repository 110.

Implementations of the current subject matter can include a more efficient updating procedure for the content index 218 and/or content cache 710. An example of such an approach can include updating a metadata index 720 first during an index update. There are a number of changes to metadata that can occur for a given content item that would explicitly not require an update to the indexing of content of the content item (for example, a renaming of the content item, a moving of the content item to a different location within a file structure hierarchy of the CMS 100, a change to a disposal schedule for a record in a records management application, designation of a content item as a record—thereby indicating that no further change to content are possible, or the like). Furthermore, a content item that does not have any change to metadata can be identified as not having a content change. For example, if a content change occurs, the metadata would be updated to reflect a new "saved" timestamp or the like. Absence of any metadata change would therefore indicate that no change has occurred to the content.

Based on the indexed metadata for a repository, the content cache 710 can be selectively updated on some desired interval (e.g. at regular intervals, when a certain number of accesses have occurred, when some other condition occurs or is met, etc.). In this context, selective updating refers to replacing content in the content cache 710 and/or updating the content index 218 as a whole for any content items that have undergone a change (as indicated by the metadata index 710) without needing to update the entirety of the content cache 710. In this manner, metadata indexing can occur more frequently than content indexing and/or caching of content, thereby keeping the metadata index more current while also allowing less frequent updating of the full content index 218 and/or content cache 710.

Figure 8:
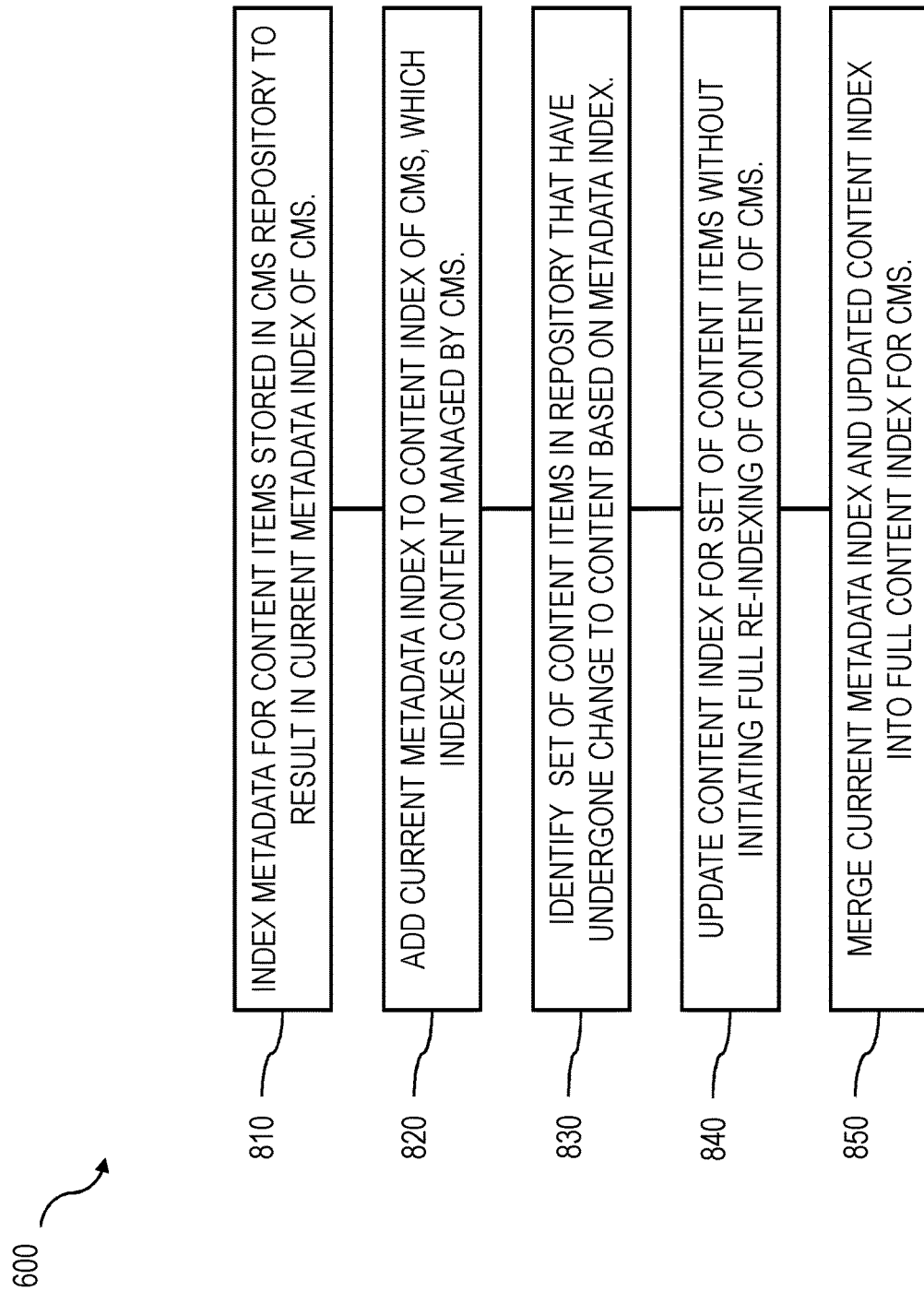
FIG. 8 shows a process flow diagram illustrating aspects of a method for indexing content items in a content management system consistent with implementations of the current subject matter.

Consistent with implementations of the current subject matter, a method as described in FIG. 8 can be used for updating a search engine content index 218 for content items managed by a CMS 100. At 810, metadata for content items stored in a repository of the CMS are indexed. The indexing results in a current metadata index of the content management system. At 8200, the current metadata index is added to a content index of the CMS. The content index indexes content managed by the CMS. Based on the metadata index, a set of content items in the repository that have undergone a change to content is identified at 830, and the content index for the set of content items is updated at 840 without initiating a full re-indexing of the content of the content management system. At 850 the current metadata index and the updated content index are merged into a full content index for the content management system. The merging can occur according to a regular schedule or in response to occurrence of a triggering event or the like.

As noted above, the content index 218 can include a content cache 710, which can, in some implementations of the current subject matter, store a full-text copy of the textual content of all content items managed by the CMS 100. As maintenance of such a content cache can be resource-intensive, it can be advantageous to use the above-noted approach to causing updates of the content cache 710. In one example, the metadata index 720 can be updated on a more frequent schedule than the content index 218. Periodic merges of the metadata index and the content index 218 can be scheduled less frequently. However, the content index 218, and optionally the content cache, can be selectively updated in response to detection of updates to the metadata index 720.

One potential use for a content cache 710 as described herein is in provided term hit highlighting in response to a text-based search on content managed by the CMS. In general, a search that includes a query input can be performed using the content index 218, which includes both a metadata index and indexed content from the content items managed by the CMS 100. A result list identifies matching content items that match the query input. In one option, metadata referencing the matching content items is used in a lookup of the content cache. In another example, metadata referencing the matching content items can be used for making call directly to the matching content item in the repository 110 of the CMS 110. In either example, a snippet of text from the content item is returned for display in a result set. The snippet includes one or more terms of the query input shown in context as they appear in the content item. The terms in the snippet can be highlighted, for example by a different font or highlighting color; using italics, underlining, bold-facing; or the like.

In certain implementations of the current subject matter, the permissions evaluations discussed earlier in this application can be applied as part of the generation of the term hit highlighting. For example, a search engine 205 of the CMS 100 can evaluate user permissions based on a user identity of a user providing the query input and constrain the result set based on the evaluating of the user permissions. The constraining can include limiting the search engine from adding a content item of the plurality of content items to the result set unless the evaluating of the user permissions does not exclude the content item.

In the example in which a content cache 710 within the content index 218 is used for providing the context text for the snippet, the content cache may be out of date with the content item itself, for example if the content item has undergone a content change since it was last indexed. However, the use of the content cache 710 can be useful in providing a user with context of the query terms as they appeared in the content item according to the criteria by which the content item was selected for inclusion in the result set. In other words, because the content cache 710 is generally updated concurrently with the content index 218, both of the content cache and content index itself may be inconsistent with a recently updated content item. However, if that recently updated content item is identified in a search, it can be useful for the user to be able to understand why the content item was identified. Use of the content cache provide context of the query terms as they were at the time that the content index was updated.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   indexing metadata for content items stored in a repository of a content management system, the indexing resulting in a current metadata index of the content management system, the metadata being associated with one or more content items in the content management system, change to a first type of metadata indicating a change in status and a change in the content of a content item and change to a second type of metadata indicating a change in status but no change in the content of the content item,
   the metadata comprising at least one of a creation date, an edit date, a content access date, a content item size, a content item type or other information describing a corresponding indexed content item,
   the content management system also including a content index for indexing content managed by the content management system, the metadata being indexed more frequently than the content index to support less frequent updating of the content index by way of:
   identifying, based on the current metadata index, a set of content items in the repository that have undergone a change to content;
   in response to the identifying, updating the content index for only the set of content items that have undergone the change to content without initiating a full re-indexing of the content of the content management system;
   selectively updating a content cache for the content management system based on the set of content items that have undergone the change to content; and
   merging the current metadata index and the content index into an updated content index for the content management system, in response to a scheduled or triggering event.

2. A computer-implemented method as in claim 1, wherein a result set is provided in response to the query input, using dynamic faceting by which content items in the result set are used to determine facets that are likely to be of interest to the user.

3. A computer-implemented method as in claim 1, further comprising:
   generating a result set identifying matching content items in the content management system that match the query input;
   accessing text of the matching content item from the result set using metadata of the matching content items;
   returning textual context for a term of the query input from the content item; and
   displaying, via a user interface, the textual context with the term highlighted.

4. A computer-implemented method as in claim 3, further comprising updating the content cache concurrently with the content index, the content cache storing a full-text copy of content items managed by the content management system, the content cache configured to provide text excerpts showing where search terms of a query input occur within a matching content item from the content management system.

5. A computer-implemented method as in claim 4, wherein the accessing of the text of the matching content item comprises performing a lookup in the content cache based on the metadata.

6. A computer-implemented method as in claim 3, wherein the accessing of the text of the matching content item comprises directly accessing the matching content item in the repository of the content management system.

7. A computer-implemented method as in claim 3, wherein the generating of the result set is performed by a search engine associated with the content management system, and wherein the method further comprises:
evaluating, in the search engine, user permissions based on a user identity of a user providing the query input; and
constraining, by the search engine, the result set based on the evaluating of the user permissions, the constraining comprising limiting the search engine from adding a content item of a plurality of content items to the result set unless the evaluating of the user permissions does not exclude the content item.

8. A computer program product comprising a non-transitory machine-readable medium storing instructions that, when executed by at least one programmable processor, cause a computing system perform operations comprising:
indexing metadata for content items stored in a repository of a content management system, the indexing resulting in a current metadata index of the content management system, the metadata being associated with one or more content items in the content management system, change to a first type of metadata indicating a change in status and a change in the content of a content item and change to a second type of metadata indicating a change in status but no change in the content of the content item,
the metadata comprising at least one of a creation date, an edit date, a content access date, a content item size, a content item type or other information describing a corresponding indexed content item,
the content management system also including a content index for indexing content managed by the content management system, the metadata being indexed more frequently than the content index to support less frequent updating of the content index by way of:
identifying, based on the current metadata index, a set of content items in the repository that have undergone a change to content;
in response to the identifying, updating the content index for only the set of content items that have undergone the change to content without initiating a full re-indexing of the content of the content management system;
selectively updating a content cache for the content management system based on the set of content items that have undergone the change to content; and
merging the current metadata index and the content index into an updated content index for the content management system, in response to a scheduled or triggering event.

9. A computer program product as in claim 8, wherein the more frequent indexing of metadata supports less frequent updating of the full content index.

10. A computer program product as in claim 8, further comprising:
generating a result set identifying matching content items in the content management system that match the query input;
accessing text of the matching content item from the result set using metadata of the matching content items;
returning textual context for a term of the query input from the content item; and
displaying, via a user interface, the textual context with the term highlighted.

11. A computer program product as in claim 10, further comprising updating the content cache concurrently with the content index.

12. A computer program product as in claim 11, wherein the accessing of the text of the matching content item comprises performing a lookup in the content cache based on the metadata.

13. A computer program product as in claim 10, wherein the metadata comprises at least one of a creation date, an edit date, a content access date, a file size, a file type or other information describing a corresponding indexed content.

14. A computer program product as in claim 10, wherein the generating of the result set is performed by a search engine associated with the content management system, and wherein the method further comprises:
evaluating, in the search engine, user permissions based on a user identity of a user providing the query input; and
constraining, by the search engine, the result set based on the evaluating of the user permissions, the constraining comprising limiting the search engine from adding a content item of a plurality of content items to the result set unless the evaluating of the user permissions does not exclude the content item.

15. A computer-implemented system comprising:
computer hardware configured to execute instructions that when executed cause the system to perform operations comprising:
indexing metadata for content items stored in a repository of a content management system, the indexing resulting in a current metadata index of the content management system, the metadata being associated with one or more content items in the content management system, change to a first type of metadata indicating a change in status and a change in the content of a content item and change to a second type of metadata indicating a change in status but no change in the content of the content item,
the metadata comprising at least one of a creation date, an edit date, a content access date, a content item size, a content item type or other information describing a corresponding indexed content item,
the content management system also including a content index for indexing content managed by the content management system, the metadata being indexed more frequently than the content index to support less frequent updating of the content index by way of:
identifying, based on the current metadata index, a set of content items in the repository that have undergone a change to content;
in response to the identifying, updating the content index for only the set of content items that have undergone the change to content without initiating a full re-indexing of the content of the content management system;

selectively updating a content cache for the content management system based on the set of content items that have undergone the change to content; and merging the current metadata index and the content index into an updated content index for the content management system, in response to a scheduled or triggering event.

16. A system as in claim 15, wherein the merging occurs in response to a scheduled or triggering event.

17. A system as in claim 15, further comprising:
   generating a result set identifying matching content items in the content management system that match the query input;
   accessing text of the matching content item from the result set using metadata of the matching content items;
   returning textual context for a term of the query input from the content item; and
   displaying, via a user interface, the textual context with the term highlighted.

18. A system as in claim 17, further comprising updating the content cache concurrently with the content index.

19. A system as in claim 18, wherein the accessing of the text of the matching content item comprises performing a lookup in the content cache based on the metadata.

20. A system as in claim 17, wherein the generating of the result set is performed by a search engine associated with the content management system, and wherein the method further comprises:
   evaluating the query input against the content index concurrently with evaluating the user permissions based on a user identity of a user providing the query input, generating a first evaluation result and a second evaluation result, respectively; and
   combining the first evaluation result and the second evaluation result to limit the search engine from adding a content item of a plurality of content items to the result set thereby eliminating a need for post processing of the query results to eliminate results that the user does not have access permission to.

* * * * *